(12) United States Patent
Ramasubramonian et al.

(10) Patent No.: US 10,574,959 B2
(45) Date of Patent: Feb. 25, 2020

(54) COLOR REMAPPING FOR NON-4:4:4 FORMAT VIDEO CONTENT

(71) Applicant: QUALCOMM Incorporated, San Diego, CA (US)

(72) Inventors: Adarsh Krishnan Ramasubramonian, Irvine, CA (US); Joel Sole Rojals, Reus (ES); Dmytro Rusanovskyy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/027,185

(22) Filed: Jul. 3, 2018

(65) Prior Publication Data

US 2019/0014298 A1    Jan. 10, 2019

Related U.S. Application Data

(60) Provisional application No. 62/528,722, filed on Jul. 5, 2017.

(51) Int. Cl.
*H04N 9/67* (2006.01)
*H04N 9/77* (2006.01)
(Continued)

(52) U.S. Cl.
CPC .............. *H04N 9/67* (2013.01); *H04N 9/77* (2013.01); *H04N 19/122* (2014.11);
(Continued)

(58) Field of Classification Search
CPC ...... H04N 9/67; H04N 19/182; H04N 19/186; H04N 19/122; H04N 19/132; H04N 9/77; H04N 19/70
See application file for complete search history.

(56) References Cited

U.S. PATENT DOCUMENTS

| 2005/0063586 A1* | 3/2005 | Munsil | H04N 1/4053 |
| | | | 382/162 |
| 2012/0201303 A1* | 8/2012 | Yang | H04N 19/159 |
| | | | 375/240.14 |

(Continued)

FOREIGN PATENT DOCUMENTS

WO    2017151343 A1    9/2017

OTHER PUBLICATIONS

Francois E., et al., "Signalling, Backward Compatibility and Display Adaptation for HDR/WCG Video Coding (Draft 2)" 26. JCT-VC Meeting; Dec. 1, 2017-20-1-2017; Geneva; (Joint Collaborative Team on Video Coding of ISO/IEC UTC1/SC29/WG11 and ITU-TSG.16), No. JCTVC-Z1012, Mar. 27, 2017 (Mar. 27, 2017), XP030118166, 33 pages.

(Continued)

*Primary Examiner* — Jefferey F Harold
*Assistant Examiner* — Humam M Satti
(74) *Attorney, Agent, or Firm* — Shumaker & Sieffert, P.A.

(57) ABSTRACT

A video decoder is configured to reconstruct a first version of a current picture; determine a transformed sample of the first component, a transformed sample of the second component, and a transformed sample of the third component by applying a first matrix to a triplet comprising the samples of the first, second, and third components; include the transformed samples of the first, second, and third components in a second version of the current picture; determine, based on the transformed samples of the first, second, and third components and a first row of a second matrix, a set of transformed samples for the third component, the set of transformed samples for the third component including samples of the third component that are immediately neighboring the transformed sample of the third component; and (Continued)

include the set of transformed samples for the third component in the second version of the current picture.

20 Claims, 8 Drawing Sheets

(51) Int. Cl.
  *H04N 19/132* (2014.01)
  *H04N 19/122* (2014.01)
  *H04N 19/186* (2014.01)
  *H04N 19/182* (2014.01)
  *H04N 19/70* (2014.01)
(52) U.S. Cl.
  CPC ......... *H04N 19/132* (2014.11); *H04N 19/182* (2014.11); *H04N 19/186* (2014.11); *H04N 19/70* (2014.11)

(56) References Cited

U.S. PATENT DOCUMENTS

| | | | | |
|---|---|---|---|---|
| 2014/0118387 | A1* | 5/2014 | Kim | H04N 9/67 345/590 |
| 2017/0070735 | A1 | 3/2017 | Ramasubramonian et al. | |
| 2017/0134731 | A1* | 5/2017 | Tourapis | H04N 1/646 |
| 2018/0124400 | A1* | 5/2018 | He | H04N 19/46 |
| 2018/0352257 | A1* | 12/2018 | Leleannec | G06T 5/10 |
| 2018/0376143 | A1* | 12/2018 | Andersson | H04N 19/176 |
| 2019/0082186 | A1* | 3/2019 | Van Der Vleuten | H04N 9/67 |

OTHER PUBLICATIONS

International Search Report and Written Opinion—PCT/US2018/040921—ISA/EPO—dated Sep. 27, 2018 (175205WO).

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Mangold, S. et al., "IEEE 802.11e Wireless LAN for Quality of Service," ComNets TWTH Aachen Univ. of Technology, D-52074 Aachen-Germany, accessed on Jun. 21, 2018, 8 pp.

Ergen, S., "Zig/Bee/IEEE 802.15.4 Summary," Sep. 10, 2004, 37 pp.

ITU-T H.265, Series H: Audiovisual and Multimedia Systems, Infrastructure of audiovisual services—Coding of moving video, The International Telecommunication Union. Dec. 2016, 664 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Algorithm Description of Joint Exploration Test Model 5," Joint Video Exploration (JVET) of ITU-T SG16 WP3 and ISO/IEC JTC1/SC29/WG11, 5th Meeting: Geneva, CH, Jan. 12-20, 2017, JVET-E1001-v1, 44 pp.

Chen J., et al., "Algorithm Description of Joint Exploration Test Model 6 (JEM 6)," Joint Video Exploration Team (JVET) of ITU-T SG16 WP3 and ISO/IEC JTC1/SC29/WG11, 6th Meeting: Hobart, AU, Mar. 31-Apr. 7, 2017, JVET-F1001-v2, 48 pp.

Chen J., et al., "Algorithm Description of Joint Exploration Test Model 7 (JEM 7)," Joint Video Exploration Team (JVET) of ITU-T SG16 WP3 and ISO/IEC JTC1/SC29/WG11, 7th Meeting: Torino, IT, Jul. 13-21, 2017, JVET-G1001-v1, 50 pp.

Ford A., et al., "Colour Space Conversions," University of Westminster, London, Aug. 1998, 31 pp.

Schwarz H., et al., "MPEG-4 anchors for the MPEG Call for Proposals on New Tools for Video Compression Technology," ITU—Telecommunications Standardization Sector, Study Group 16 Question 16, Video Coding Experts Group (VCEG), Thirteenth Meeting: Austin, Texas, USA, Apr. 2-4, 2001, 8 pp.

\* cited by examiner

4:2:0 sample format

4:2:2 sample format

4:4:4 sample format

COLOR REMAPPING FOR NON-4:4:4 FORMAT VIDEO CONTENT

This Application claims the benefit of U.S. Provisional Patent Application 62/528,722, filed 5 Jul. 2017, the entire content of which is hereby incorporated by reference.

TECHNICAL FIELD

This disclosure relates to devices configured to perform video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

SUMMARY

This disclosure describes techniques for video encoding and video decoding. More particularly, this disclosure describes techniques related to color-space conversion coding. Existing techniques for performing color-space conversion on non-4:4:4 video, such as 4:2:0 or 4:2:2 video, include up-converting the video to a 4:4:4 format in a first color space, converting the video to a second color space in the 4:4:4 format, and down-converting the video data in the second color space from the 4:4:4 format to the non-4:4:4 format. The techniques of this disclosure enable video encoding and video decoding devices to perform color remapping for 4:2:0 content in a manner that enables the video encoding and video decoding devices to omit the steps of upsampling from 4:2:0 to 4:4:4 and downsampling from 4:4:4 to 4:2:0. As upsampling and downsampling typically require significant memory and processing resources, and the color-space conversion techniques of this disclosure may enable video encoding and video decoding devices to achieve the benefits of color-space-based coding tools without the costly burden on hardware resources that results from the upsampling and downsampling required by existing color-space conversion techniques.

In one example, a method of processing video data includes receiving a bitstream comprising an encoded representation of the video data; reconstructing, based on the bitstream, a first version of a current picture of the video data, wherein: the first version of the current picture is formatted according to a sampling format in which there are fewer samples of a first component and a second component than of a third component, the first version of the current picture includes a sample of the first component, a sample of the second component, and a sample of the third component, and the sample of the third component corresponds to the sample of the first component and the sample of the second component; determining a transformed sample of the first component, a transformed sample of the second component, and a transformed sample of the third component by applying a first matrix to a triplet comprising the sample of the first component, the sample of the second component, and the sample of the third component; including the transformed sample of the first component, the transformed sample of the second component, and the transformed sample of the third component in a second version of the current picture; determining, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and including the set of transformed samples for the third component in the second version of the current picture.

According to another example, a device for processing video data includes a memory configured to store a bitstream comprising an encoded representation of the video data and one or more processors configured to reconstruct, based on the bitstream, a first version of a current picture of the video data, wherein the first version of the current picture is formatted according to a sampling format in which there are fewer samples of a first component and a second component than of a third component, the first version of the current picture includes a sample of the first component, a sample of the second component, and a sample of the third component, and the sample of the third component corresponds to the sample of the first component and the sample of the second component, determine a transformed sample of the first component, a transformed sample of the second component, and a transformed sample of the third component by applying a first matrix to a triplet comprising the sample of the first component, the sample of the second component, and the sample of the third component; include the transformed sample of the first component, the transformed sample of the second component, and the transformed sample of the third component in a second version of the current picture; determine, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and include the set of transformed samples for the third component in the second version of the current picture.

According to another example, a computer-readable storage medium stores instructions that when executed by one or more processors cause the one or more processors to receive a bitstream comprising an encoded representation of the video data; reconstruct, based on the bitstream, a first version of a current picture of the video data, wherein the first version of the current picture is formatted according to a sampling format in which there are fewer samples of a first component and a second component than of a third component, the first version of the current picture includes a sample of the first component, a sample of the second component, and a sample of the third component, and the sample of the third component corresponds to the sample of the first component and the sample of the second component; determine a transformed sample of the first component, a transformed sample of the second component, and a transformed sample of the third component by applying a first matrix to a triplet comprising the sample of the first component, the sample of the second component, and the sample of the third component; include the transformed sample of the first component, the transformed sample of the second component, and the transformed sample of the third component in a second version of the current picture; determine, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and include the set of transformed samples for the third component in the second version of the current picture.

According to another example, a device for processing video data includes means for receiving a bitstream comprising an encoded representation of the video data; means for reconstructing, based on the bitstream, a first version of a current picture of the video data, wherein the first version of the current picture is formatted according to a sampling format in which there are fewer samples of a first component and a second component than of a third component, the first version of the current picture includes a sample of the first component, a sample of the second component, and a sample of the third component, and the sample of the third component corresponds to the sample of the first component and the sample of the second component; means for determining a transformed sample of the first component, a transformed sample of the second component, and a transformed sample of the third component by applying a first matrix to a triplet comprising the sample of the first component, the sample of the second component, and the sample of the third component; means for including the transformed sample of the first component, the transformed sample of the second component, and the transformed sample of the third component in a second version of the current picture; means for determining, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and means for including the set of transformed samples for the third component in the second version of the current picture.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques for video encoding and video decoding. Extensions of and successor standards to the recently finalized high efficiency video coding (HEVC) standard are being designed to potentially support high bit depth (e.g. more than 8 bit), wide color gamut (WCG), and/or high chroma sampling formats and are, therefore, being designed to include new coding tools not included in the base HEVC standard.

One such coding tool is color-space conversion coding. In color-space conversion coding, a video encoder may convert residual data from a first color space to a second color space in order to achieve better coding quality (e.g. a better rate-distortion tradeoff). Various other coding tools also utilize color-space conversion to perform mapping, clipping, filtering, and other such processes in a color space that is different than the color space of the original video data. Existing techniques for performing color-space conversion on non-4:4:4 video, such as 4:2:0 or 4:2:2 video, include up-converting the video to a 4:4:4 format in a first color space, converting the video to a second color space in the 4:4:4 format, and down-converting the video data in the second color space from the 4:4:4 format to a non-4:4:4 format. The two color spaces may, for example, be a YCbCr color space and an RGB color space or may be a YCbCr color space with a first dynamic range and a YCbCr color space with a second dynamic range.

The techniques of this disclosure enable video encoding and video decoding devices to perform color remapping by, for example, applying a 3×3 matrix multiplication to 4:2:0 content in a manner that enables the video encoding and video decoding devices to omit the steps of upsampling from 4:2:0 to 4:4:4 and downsampling from 4:4:4 to 4:2:0. As upsampling and downsampling typically require significant memory and processing resources, and the color-space conversion techniques of this disclosure may enable video encoding and video decoding devices to achieve the benefits of color-space-based coding tools without costly burden on hardware resources that result from the upsampling and downsampling required by existing color-space conversion techniques.

Figure 1:
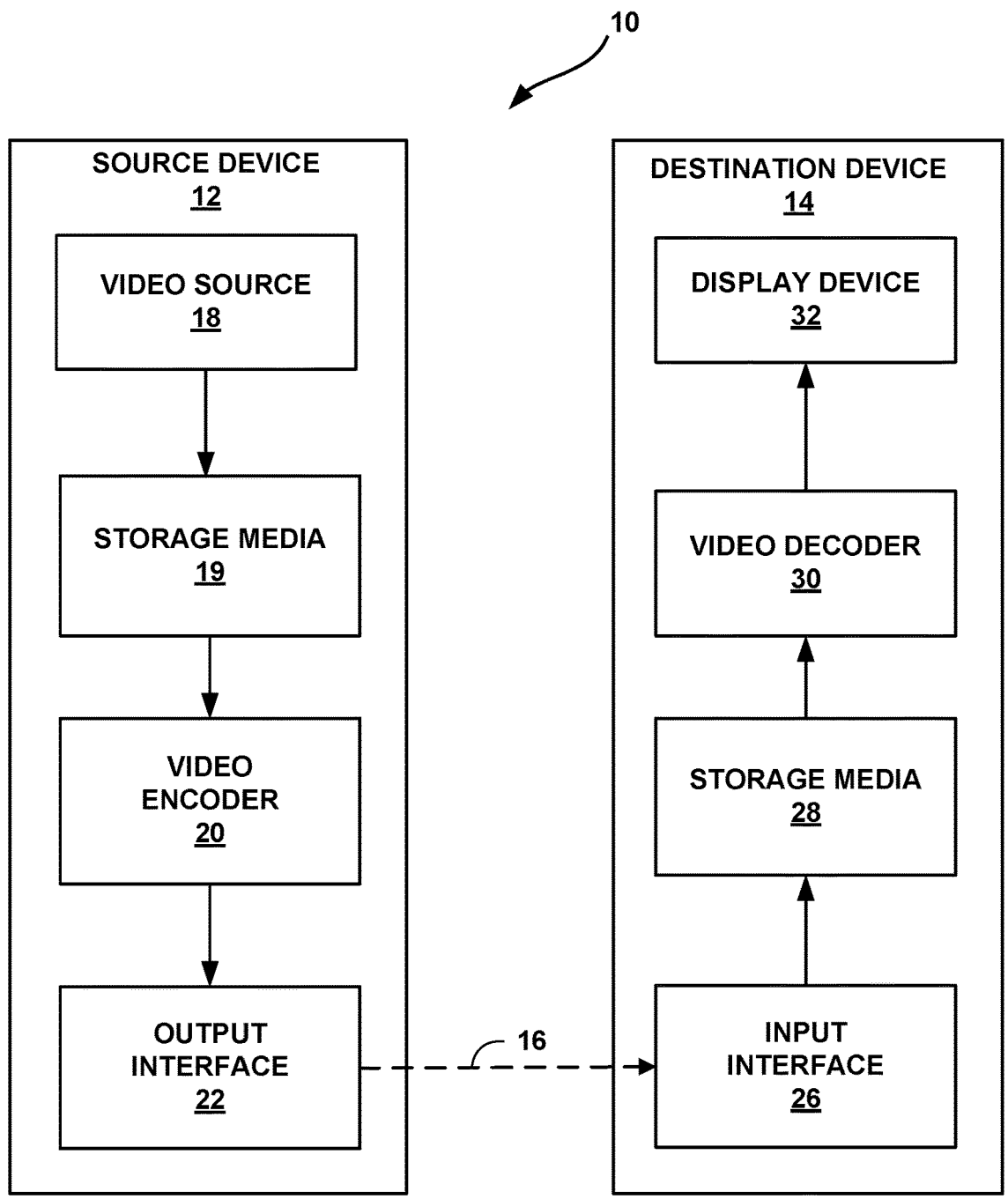
FIG. 1 is a block diagram illustrating an example video encoding and decoding system that may use one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may be any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may include a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may include various types of components or devices. For example, output interface 22 may be one or more of a wireless transmitter, a modem, a wired networking component (e.g., an Ethernet card), or another physical component. In examples where output interface 22 includes a wireless transmitter, output interface 22 may be configured to transmit data, such as encoded video data, modulated according to a cellular communication standard, such as 4G, 4G-LTE, LTE Advanced, 5G, and the like. In some examples where output interface 22 includes a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may be any type of medium or device capable of moving the encoded video data from source device 12 to destination device 14. In some examples, computer-readable medium 16 can be a communication medium to enable source device 12 to transmit encoded video data directly to destination device 14 in real-time. The communication medium may be any wireless or wired communication medium, or combination thereof, such as a radio frequency (RF) spectrum and/or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may include one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray™ discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (e.g., a non-transitory storage media), such as a hard disk, flash drive, compact disc, digital video disc, Blu-ray™ disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may include various types of components or devices. For example, input interface 26 may include a wireless receiver, a modem, a wired networking component (e.g., an Ethernet card), or another physical component. In examples where input interface 26 includes a wireless receiver, input interface 26 may be configured to receive data, such as the bitstream, modulated according to a cellular communication standard, such as 4G, 4G-LTE, LTE Advanced, 5G, and the like. In some examples where input interface 26 includes a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may be any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC). HEVC was been developed by the Joint Collaboration Team on Video Coding (JCT-VC) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The JVET first met during 19-21 Oct. 2015. One version of the JVET reference software, including an algorithm description, is set forth in the document Joint Exploration Model 5 (JEM 5), J. Chen, E. Alshina, G. J. Sullivan, J.-R. Ohm, J. Boyce, "Algorithm Description of Joint Exploration Test Model 5 (JEM 5)", JVET-E1001, January 2017. Another version of the JVET reference software is described in the document Joint Exploration Model 6 (Jem 6), J. Chen, E. Alshina, G. J. Sullivan, J.-R. Ohm, J. Boyce, "Algorithm description of Joint Exploration Test Model 6 (JEM 6)", JVET-F1001, April 2017. Another version of the JVET reference software is described in the document Joint Exploration Model 7 (JEM 7), J. Chen, E. Alshina, G. J. Sullivan, J.-R. Ohm, J. Boyce, "Algorithm description of Joint Exploration Test Model 7 (JEM 7)", JVET-G1001, July 2017.

Certain techniques of this disclosure may be described with reference to H.264 and/or HEVC to aid in understanding, but the techniques described are not limited to H.264 or HEVC and can be used in conjunction with other coding standards and other coding tools. It is contemplated, for example, that the techniques described herein may be used with the H.266 standard presently under development, and extensions thereof.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in a bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may include an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block includes residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may include one or more CTBs and may include syntax structures used to encode the samples of the one or more CTBs. For instance, each CTU may include a CTB of luma samples, two corresponding CTBs of chroma samples, and syntax structures used to encode the samples of the CTBs. In monochrome pictures or pictures having three separate color planes, a CTU may include a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may include one or more coding blocks and syntax structures used to encode samples of the one or more coding blocks. For example, a CU may include a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may include a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may include one or more prediction blocks of a CU and syntax structures used to predict the one or more prediction blocks. For example, a PU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may include one or more transform blocks. For example, a TU may include a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may include a sequence of bits that forms a representation of encoded pictures of the video data and associated data. In some examples, a representation of an encoded picture may include encoded representations of blocks of the picture.

In some examples, the bitstream may include a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may include an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

Color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used as described in A. Ford and A. Roberts, "Colour space conversions," University of Westminster, London, Tech. Rep., August 1998. YCbCr can be converted from RGB color space via a linear transformation. The redundancy between different components, namely the cross-component redundancy, can be significantly reduced in the YCbCr color space. Another advantage of YCbCr is the backward compatibility with black and white televisions as the Y signal conveys the luminance information. In addition, chrominance bandwidth can be reduced by sub-sampling the Cb and Cr components in a 4:2:0 chroma sampling format. Subsampling in the YCbCr color space typically has significantly less subjective impact on video quality than subsampling in the RGB color. Due to these advantages, YCbCr has been the major color space in video compression. There are also other color spaces, such as YCoCg, used in video compression. This disclosure describes techniques with reference to the YCbCr color space, but the techniques described herein may also be utilized with other color spaces.

Figure 2:
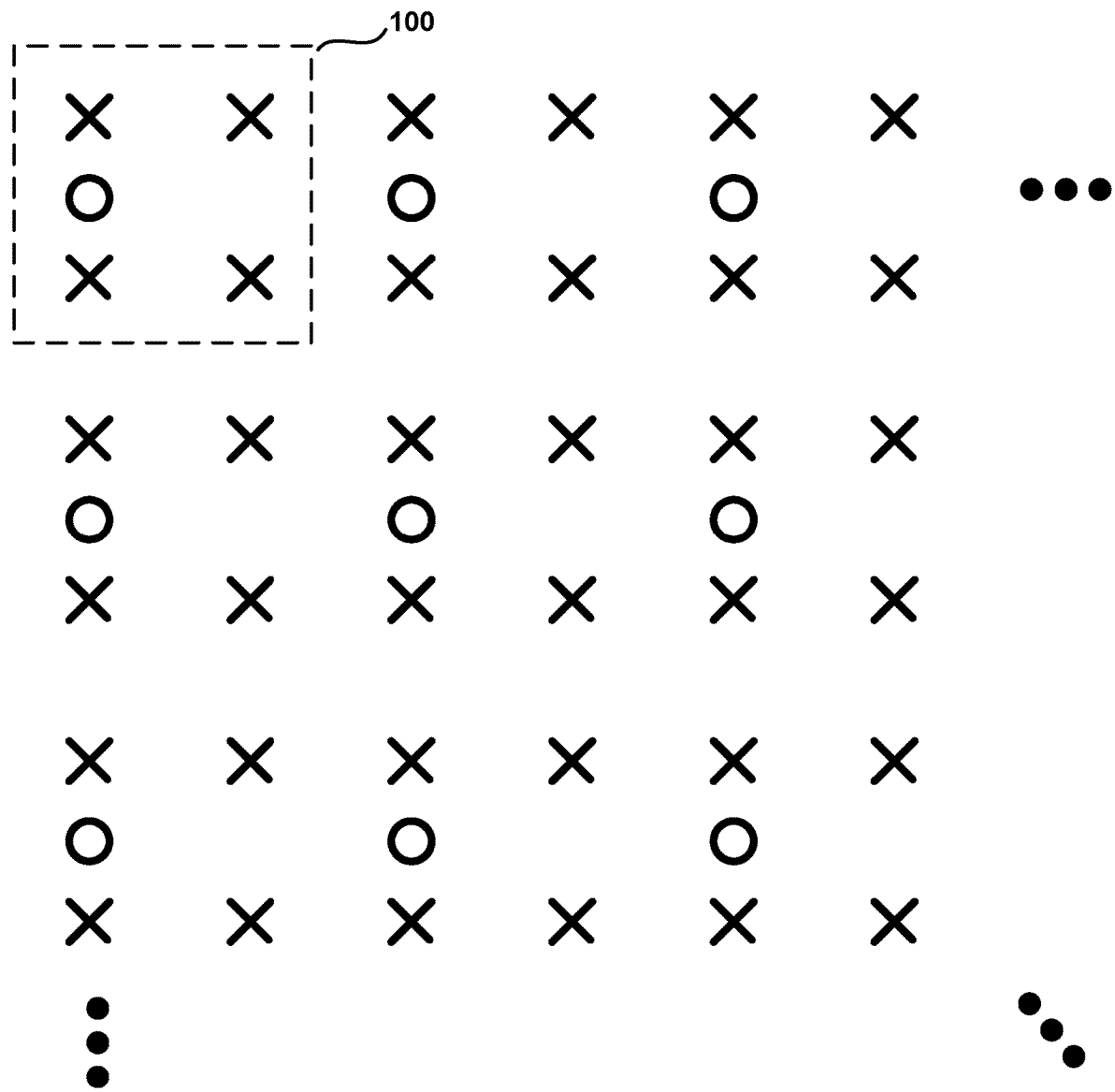
FIG. 2 shows an example of nominal vertical and horizontal locations of 4:2:0 luma and chroma samples in a picture.

Chroma subsampling formats are typically expressed as a three-part ratio J:a:b (e.g. 4:4:4, 4:2:2, 4:2:0) that describe the number of luma and chroma samples in a conceptual region that is J pixels wide and 2 pixels high. "J" represents the horizontal sampling reference (i.e., the width of the conceptual region), which in HEVC is usually 4. "a" represents the number of chrominance samples (Cr, Cb) in the first row of J pixels, and "b" represents the number of changes of chrominance samples (Cr, Cb) between the first and the second row of J pixels FIG. 2 shows an example of nominal vertical and horizontal locations of 4:2:0 luma and chroma samples in a picture. In 4:2:0 sampling, each of the two chroma arrays has half the height and half the width of the luma array, with height and width being measured in terms of number of samples. Thus, as can be seen by the example of sub-block 100 in FIG. 2, in the 4:2:0 sampling format, a 1×1 block of chroma samples corresponds to a 2×2 block of luma samples, meaning chroma blocks have one-fourth the resolution of their corresponding luma blocks in the 4:2:0 sampling format.

Figure 3A:
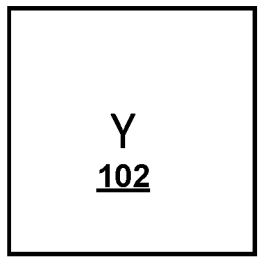
FIGS. 3A-3C are conceptual diagrams illustrating different color sample formats for luma and chroma components of a coding unit.
Figure 3B:
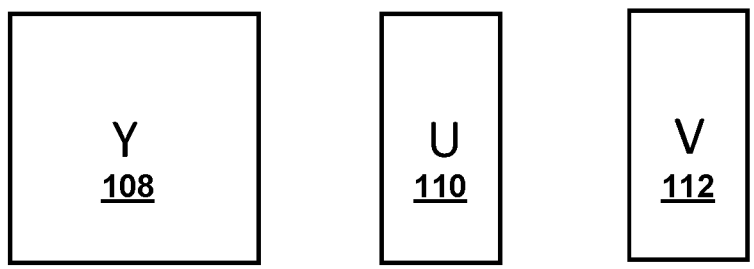
Figure 3C:
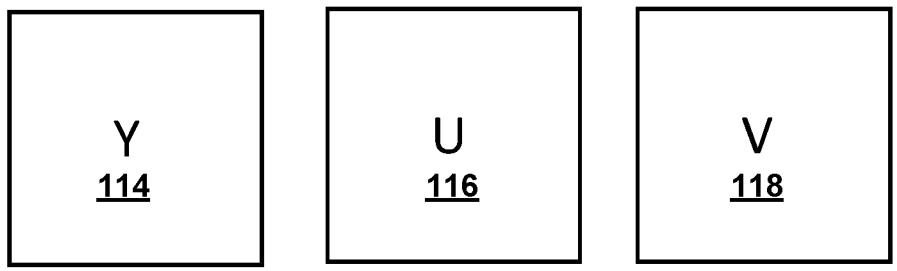

FIGS. 3A-3C are conceptual diagrams illustrating different sample formats for luma (Y) and chroma components (U and V) of a coding unit. FIG. 3A is a conceptual diagram illustrating the 4:2:0 sample format. As illustrated in FIG. 3A, for the 4:2:0 sample format, the chroma components (U 104 and V 106) are one quarter of the size of the luma component (Y 102). Thus, for a CU formatted according to the 4:2:0 sample format, there are four luma samples for every sample of a chroma component. FIG. 3B is a conceptual diagram illustrating the 4:2:2 sample format. As illustrated in FIG. 3B, for the 4:2:2 sample format, the chroma components (U 110 and V 112) are one half of the size of the luma component (Y 108). Thus, for a CU formatted according to the 4:2:2 sample format, there are two luma samples for every sample of a chroma component. FIG. 3C is a conceptual diagram illustrating the 4:4:4 sample format. As illustrated in FIG. 3C, for the 4:4:4 sample format, the chroma components (U 116 and V 118) are the same size as the luma component (Y 114). Thus, for a CU formatted according to the 4:4:4 sample format, there is one luma sample for every sample of a chroma component. Video encoder 20 and video decoder 30 may be configured to code video data in any of a 4:2:0, 4:2:2, or 4:4:4 sample format.

In various coding standards and various extensions thereof, supplemental enhancement information (SEI) contains information that may not be necessary to decode the samples of coded pictures from VCL NAL units. Such SEI information is included in various SEI messages. One such message is a color remapping information (CRI) SEI message which is used to convey information that is used to map pictures in one color space to another color space. The syntax of the CRI SEI message can include three parts: a first set of three 1-D look-up tables (Pre-LUT), followed by a 3×3 matrix, followed by second set of three 1-D look-up tables (Post-LUT). For each color component, e.g. R,G,B or Y,Cb,Cr, an independent LUT is defined for both, Pre-LUT and Post-LUT.

Figure 4:
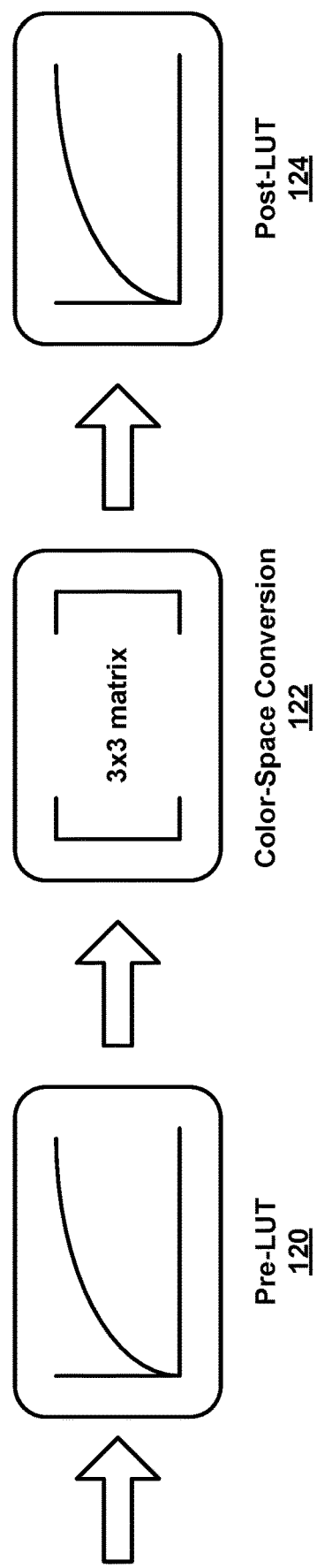
FIG. 4 shows a structure of the color remapping information/process used by a color remapping information (CRI) supplemental enhancement information (SEI) message.

FIG. 4 shows an example of a color remapping process that includes pre-LUT process 120, color-space conversion process 122, and post-LUT process 124. Color-space conversion process may utilize a 3×3 matrix as described in this disclosure. The information needed for performing the color-remapping processing may signaled in a CRI SEI message. The application of the set of the three pre-LUTs may be referred to as DRA (dynamic range adjustment), although DRA can also refer to the general idea of mapping the content using look-up tables (e.g. piece-wise linear or otherwise) to redistribute codeword values in the range. In some examples, pre-LUT process 120 and post-LUT process 124 may be applied to map the content from one dynamic range to another or to adapt the content based on certain characteristic (e.g. peak luminance). The use of pre-LUT process 120 and post-LUT process 124 are examples of processes that are signaled in the CRI SEI message and are examples of processes that may happen before and after color-space conversion process 122.

It should be understood that pre-LUT process 120 and post-LUT process 124 may not always be applied, depending on the application for which the CRI message was designed. For example, if content is already in a linear space and the 3×3 matrix is used to do a color-space conversion in the linear space, then pre-LUT process 120 may not be applied. In another example, if the mapping by the 3×3 matrix is defined in a linear space and the content is non-linear space, then pre-LUT process 120 may be used to convert the non-linear content to linear content before color-space conversion process 122 (i.e., application of the 3×3 matrix). In this example, post-LUT process 124 may be applied to bring the content back to a non-linear space after application of the 3×3 matrix conversion by color-space conversion process 122. In other examples, pre-LUT process 120 and post-LUT process 124 may be replaced with other video processing algorithms, and the 3×3 matrix for the conversion may be applied using a different mechanism. If such a mechanism utilizes conversion of content to a 4:4:4 format using upsampling and subsequently downsampling, then the techniques disclosed herein may be helpful in reducing the processing complexity.

The syntax of a CRI SEI message can be as follows:

| | Descriptor |
|---|---|
| colour_remapping_info( payloadSize ) { | |
|   colour_remap_id | ue(v) |
|   colour_remap_cancel_flag | u(1) |
|   if( !colour_remap_cancel_flag ) { | |
|     colour_remap_persistence_flag | u(1) |
|     colour_remap_video_signal_info_present_flag | u(1) |
|     if( colour_remap_video_signal_info_present_flag ) { | |
|       colour_remap_full_range_flag | u(1) |
|       colour_remap_primaries | u(8) |
|       colour_remap_transfer_function | u(8) |
|       colour_remap_matrix_coefficients | u(8) |
|     } | |
|     colour_remap_input_bit_depth | u(8) |
|     colour_remap_bit_depth | u(8) |
|     for( c = 0; c < 3; c++ ) { | |
|       pre_lut_num_val_minus1[ c ] | u(8) |
|       if( pre_lut_num_val_minus1[ c ] > 0 ) | |
|         for( i = 0; i <= pre_lut_num_val_minus1[ c ]; i++ ) { | |
|           pre_lut_coded_value[ c ][ i ] | u(v) |
|           pre_lut_target_value[ c ][ i ] | u(v) |
|         } | |
|     } | |
|     colour_remap_matrix_present_flag | u(1) |
|     if( colour_remap_matrix_present_flag ) { | |
|       log2_matrix_denom | u(4) |
|       for( c = 0; c < 3; c++ ) | |
|         for( i = 0; i < 3; i++ ) | |
|           colour_remap_coeffs[ c ][ i ] | se(v) |
|     } | |
|     for( c = 0; c < 3; c++ ) { | |
|       post_lut_num_val_minus1[ c ] | u(8) |
|       if( post_lut_num_val_minus1[ c ] > 0 ) | |
|         for( i = 0; i <= post_lut_num_val_minus1[ c ]; i++ ) { | |
|           post_lut_coded_value[ c ][ i ] | u(v) |
|           post_lut_target_value[ c ][ i ] | u(v) |
|         } | |
|     } | |
|   } | |
| } | |

The semantics of CRI SEI messages are described in ITU-T H.265, Series H: Audiovisual and Multimedia Systems: Infrastructure of audiovisual services—coding of moving video: High Efficiency Video Coding (December 2016), referred to hereinafter as H.265, Series H. H.265, Series H states:

>The colour remapping information SEI message provides information to enable remapping of the reconstructed colour samples of the output pictures. The colour remapping information may be applied directly to the decoded sample values, regardless of whether they are in the luma and chroma domain or the RGB domain. The colour remapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein).
>
>NOTE 1—Colour remapping of the output pictures for the display is optional and does not affect the decoding process specified in this Specification.

According to H.265, Series H, the syntax element "colour_remap_id" contains an identifying number that may be used to identify the purpose of the colour remapping information. The value of colour_remap_id can be in the range of 0 to $2^{32}-2$, inclusive. Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T ISO/IEC. Decoders can ignore colour remapping information SEI messages containing a value of colour_remap_id in the range of 256 to 511, inclusive, or in the range of $2^{31}$ to $2^{32}-2$, inclusive, and bitstreams may not contain such values. H.265, Series H states:

NOTE 2—The colour_remap_id can be used to support different colour remapping processes that are suitable for different display scenarios. For example, different values of colour_remap_id may correspond to different remapped colour spaces supported by displays.

According to H.265, Series H, the syntax element "colour_remap_matrix_coefficients" has the same semantics as specified in clause E.3.1 for the matrix_coeffs syntax element, except that colour_remap_matrix_coefficients specifies the colour space of the remapped reconstructed picture, rather than the colour space used for the coded layer-wise video sequence. When not present, the value of colour_remap_matrix_coefficients is inferred to be equal to the value of matrix_coeffs.

According to H.265, Series H, the syntax element "colour_remap_input_bit_depth" specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth. The value of colour_remap_input_bit depth can be in the range of 8 to 16, inclusive. Values of colour_remap_input_bit_depth from 0 to 7, inclusive, and from 17 to 255, inclusive, are reserved for future use by ITU-T ISO/IEC. Decoders can ignore all colour remapping SEI messages that contain a colour_re-map_input_bit_depth in the range of 0 to 7, inclusive, or in the range of 17 to 255, inclusive, and bitstreams may not contain such values.

According to H.265, Series H, the syntax element "colour_remap_bit_depth" specifies the bit depth of the output of the colour remapping function described by the colour remapping information SEI message. The value of colour_remap_bit_depth can be in the range of 8 to 16, inclusive. Values of colour_remap_bit_depth from 0 to 7, inclusive, and in the range of 17 to 255, inclusive, are reserved for future use by ITU-T ISO/IEC. Decoders can ignore colour remapping SEI messages that contain a value of colour_remap_bit_depth from 0 to 7, inclusive, or in the range of 17 to 255, inclusive.

According to H.265, Series H, the value of the syntax element "pre_lut_num val_minus1[c]" plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{colour\_remap\_bit\_depth}-1$, for the c-th component. In bitstreams conforming to the H.265, Series H Specification, the value of pre_lut_num_val_minus1[c] can be in the range of 0 to 32, inclusive.

According to H.265, Series H, the syntax element "pre_lut_coded_value[c][i]" specifies the value of the i-th pivot point for the c-th component. The number of bits used to represent pre_lut_coded_value[c][i] is ((colour_remap_input_bit_depth+7)>>3)<<3.

According to H.265, Series H, the syntax element "pre_lut_target_value[c][i]" specifies the value of the i-th pivot point for the c-th component. The number of bits used to represent pre_lut_target_value[c][i] is ((colour_remap_bit_depth+7)>>3)<<3.

According to H.265, Series H, the syntax element "colour_remap_matrix_present_flag" equal to 1 indicates that the syntax elements log2_matrix_denom and colour_remap_coeffs[c][i], for c and i in the range of 0 to 2, inclusive, are present. colour_remap_matrix_present_flag equal to 0 indicates that the syntax elements log2_matrix_denom and colour_remap_coeffs[c][i], for c and i in the range of 0 to 2, inclusive, are not present.

According to H.265, Series H, the syntax element "log2_matrix_denom" specifies the base 2 logarithm of the denominator for all matrix coefficients. The value of log2_matrix_denom shall be in the range of 0 to 15, inclusive. When not present, the value of log2_matrix_denom is inferred to be equal to 0.

According to H.265, Series H, the syntax element "colour_remap_coeffs[c][i]" specifies the value of the three-by-three colour remapping matrix coefficients. The value of colour_remap_coeffs[c][i] can be in the range of $-2^{15}$ to $2^{15}-1$, inclusive. When colour_remap_coeffs[c][i] is not present, it is inferred to be equal to 1 if c is equal to i, and inferred to be equal to 0 otherwise. When colour_remap_matrix_present_flag is equal to 0, the colour remapping matrix is inferred to be equal to the identity matrix of size 3×3.

H.265, Series H further states:

---

The variable matrixOutput[ c ] for c = 0, 1 and 2 is derived as follows:
roundingOffset = log2_matrix_denom = = 0 ? 0 : 1 <<
  ( log2_matrix_denom − 1)
  matrixOutput[ c ] = Clip3( 0, ( 1 << colour_remap_output_bit_depth ) − 1,
    ( colour_remap_coeffs[ c ][ 0 ] * matrixInput[ 0 ] +
  colour_remap_coeffs[ c ][ 1 ] * matrixInput[ 1 ]
    + colour_remap_coeffs[ c ][ 2 ] * matrixInput[ 2 ] + roundingOffset )
  >> log2_matrix_denom) (D-50)
where matrixInput[ c ] is the input sample value of the c-th colour
  component,and matrixOutput[ c ] is the output sample value of the c-th
  colour component.
...

---

The semantics of post_lut_num_val_minus[ ], post_lut_coded_value[ ][ ], and post_lut_target_value[ ][ ] are similar to the semantics of pre_lut_num_val_minus[ ], pre_lut_coded_value[ ][ ], and pre_lut_target_value[ ][ ], respectively; the number of bits used to represent post_lut_coded_value[ ][ ], and post_lut_target_value[ ][ ] is equal to colour_remap_bit_depth.

Next generation video applications are anticipated to operate with video data representing captured scenery with high dynamic range (HDR) and WCG. CRI is currently signaled in SEI messages for AVC and HEVC. SEIs are not mandatory, meaning video data can be decoded even if SEIs are not received or are disregarded. However, it has been observed that a proper application of CRI/DRA before the encoder and the corresponding inverse CRI/DRA after the decoder may help to improve the coding efficiency of HDR/WCG content, or generally, content that does not have a typical maximum to minimum brightness ratio. Consequently, it is expected that technology like CRI and/or DRA may become a normative part of next generation video codecs, meaning CRI and DRA may be part of the compression process. Therefore, improvements to CRI and DRA may contribute to overall improvements in compression.

The current mechanism for CRI allows the 3×3 matrix to be applied only to 4:4:4 content. E.g., the HEVC specification has the following restriction:

Unless indicated otherwise by some means not specified in this Specification, the input to the indicated remapping process is the set of decoded sample values after applying an (unspecified) upsampling conversion process to the 4:4:4 colour sampling format as necessary when the colour remapping three-by-three matrix coefficients are present in the SEI message and chroma_format_idc is equal to 1 (4:2:0 chroma format) or 2 (4:2:2 chroma format).

This approach was developed because the input to the 3×3 matrix is a sample of each color component (be it YCbCr or RGB or other). The matrix is applied to a triplet of collocated samples (e.g., Yi, Cbi and Cri), as the following equations show.

$$M3\times3 = \begin{bmatrix} a11 & a12 & a13 \\ a21 & a22 & a23 \\ a31 & a32 & a33 \end{bmatrix} \quad (1)$$

$$\begin{bmatrix} Yo \\ Cbo \\ Cro \end{bmatrix} = M3\times3 \begin{bmatrix} Yi \\ Cbi \\ Cri \end{bmatrix} \quad (2)$$

The equations define the 3×3 matrix and how the 3×3 matrix is applied to three components of video content. Application of upsampling and downsampling to convert 4:2:0 chroma format to 4:4:4 chroma format involves significant processing (e.g. multi-tap filtering) and memory requirements. Therefore, it may be preferable to perform the 3×3 matrix multiplication in the "smaller" chroma format (such as 4:2:0, 4:2:2), especially if the input and the output of the system are also in the smaller chroma format.

In the case of 4:2:0 video, there are four luma samples for each chroma sample, so the same mechanism cannot be applied, as there are not enough chroma samples to be grouped together with the corresponding luma samples. It may be beneficial for the process to be invertible, such that the original samples (or the uncompressed version of the original samples) can be recovered. Generally, the 3×3 matrix is invertible. In the following examples, I3×3 represents the inverse matrix of M3×3. Thus, I3×3 * M3×3 = Identity. Then, up to quantization errors, the input samples (Yi, Cbi, Cri) can be recovered as follows:

$$\begin{bmatrix} Yi \\ Cbi \\ Cri \end{bmatrix} = I3\times3 \begin{bmatrix} Yo \\ Cbo \\ Cro \end{bmatrix} \quad (3)$$

Many of the problems applicable to 4:2:0 chroma format are also applicable to other formats (e.g. 4:2:2 chroma format).

This disclosure describes techniques that enable a 3×3 matrix to be applied to 4:2:0 content. Thus, when implementing the techniques of this disclosure, video encoder 20 and video decoder 30 may apply a matrix to 4:2:0 content in a manner similar to how a matrix is currently applied to the 4:4:4 content, while still accounting for the fact that not every luma sample has a unique corresponding chroma sample. Also, the techniques of this disclosure are reversible, meaning that the input samples of the forward process can be recovered from the output samples and the 3×3 matrix (up to quantization/compression errors). By implementing the techniques of this disclosure, video encoder 20 and video decoder 30 potentially avoid the costly process of upsampling from 4:2:0 to 4:4:4 and downsampling from 4:4:4 to 4:2:0 when performing color-space conversion. A system similar to the one described below can also be applied to 4:2:2 content or other chroma formats.

For 4:2:0 chroma format content, video encoder 20 may implement a forward process. Video encoder 20 may apply a forward 3×3 matrix for a luma sample Yi and the corresponding/collocated Cbi and Cri samples as shown by equation 4. For equation 4, Yi may correspond to the top-left of the four luma samples associated with chroma samples Cbi and Cri.

$$\begin{bmatrix} Yo \\ Cbo \\ Cro \end{bmatrix} = M3\times3 \begin{bmatrix} Yi \\ Cbi \\ Cri \end{bmatrix} \quad (4)$$

For the other three out of four luma samples, video encoder 20 may apply only the first row of the 3×3 matrix as in equation 5:

$$Yo = \alpha11 * Yi + \alpha12 * Cbi + \alpha13 * Cri \quad (5)$$

In this way, video encoder 20 generates a 4:2:0 output using the 3×3 matrix.

Video decoder 30 may apply an inverse process to the process applied by video encoder 20. To recover Cbi and Cri, video decoder 30 applies the inverse 3×3 matrix I3×3 to the collocated Y sample (or top-left of the 4 luma samples associated with chroma). I3×3 may either be inferred by video decoder 30 or signaled in a bitstream of video data.

Video decoder 30 can compute the collocated Y sample with the inverse 3×3 matrix. For the other three samples of the Y component, the forward vector for the luma component may be used as follows (this can also be applied to the collocated luma sample):

$$Yi = \frac{Yo - a12*Cbi - a13*Cri}{a11} \qquad (6)$$

The first row of the forward 3×3 matrix (3×1ForVec) may be computed by video decoder 30, or, in order to avoid computations needed for determining the first row of the forward 3×3 matrix, video decoder 30 may decode the first row of the forward 3×3 matrix based on signaling received in the bitstream of video data. If video decoder 30 decodes the first row of the forward 3×3 matrix based on signaling received in the bitstream of video data, then there may be no need to signal the first row of the inverse 3×3 matrix.

It is to be understood that the operation described above for video encoder 20 and video decoder 30 may not always be coupled as described above, and video encoder 20 (or any device that applies the forward processing) or video decoder 30 (or any device that applies the inverse processing) may apply an alternate process.

In some examples, a matrix computation is applied to a 2×2 luma sample block and the corresponding chroma samples (one Cb, one Cr sample in 4:2:0 domain, and two Cb, two Cr samples in 4:2:2 domain), e.g. using a 7×7 matrix (for 4:2:0 case), and the inverse matrix is either signaled (fully or partially) or derived at the decoder side to recover samples in the input domain. In some examples, when using a 3×3 matrix to apply color-space conversion to 4:4:4 content, the 3×3 matrix may be applied to each Y-Cb-Cr triplet and may be applied on 4:2:0 content by deriving a different matrix (e.g. 6×6 matrix) that can be applied on sextuplets Y1-Y2-Y3-Y4-Cb-Cr, where Y1-Y2-Y3-Y4 represent four luma samples and Cb and Cr represent the corresponding chroma sample component. This 6×6 matrix may be derived from a 3×3 matrix using a pre-determined algorithm or may be specified separately. The inverse of this matrix may be signaled to the decoder or derived at the decoder. This way, the YCbCr samples need not be upsampled and can be processed in the 4:2:0 domain directly.

Video decoder 30 may be configured to perform Cbi and Cri reconstruction. To recover Cbi and Cri, video decoder 30 may apply the inverse 3×3 matrix to the collocated Y sample (or top-left of the 4 luma samples associated with chroma). The following code illustrates an example of how video decoder 30 may implement this technique.

```
Cbi[j * widthC + i]= iClip((3x3Mat[1][0] * Yo[2 * j * width + 2 * i] +
3x3Mat[1][1] * Cbo [j * widthC + i] + 3x3Mat[1][2] * Cro[j * widthC + i] + rOffset) >>
log2Den, 0, max_v);
    Cri[j * widthC + i] = iClip((3x3Mat[2][0] * Yo[2 * j * width + 2 * i] +
3x3Mat[2][1] * Cbo[j * widthC + i] + 3x3Mat[2][2] * Cro [j * widthC + i] + rOffset) >>
log2Den, 0, max_v);
``` where 3x3Mat[3][3] is the integer inverse 3×3 matrix of CRI, >> is the right-shift bit-wise operation, and iClip is a clipping function of the first argument to the minimum given by the second argument and the maximum given by the third argument. In the example above, widthC is the width of the picture in chroma samples and width is the width of the picture in luma samples.

Video decoder 30 can apply a rounding offset for better performance. Video decoder 30 can calculate the rounding offset as follows:

```
rOffset = 0;
if (log2Den > 0) {
    rOffset = 1 << (log2Den - 1);
}
``` where log2Den is the log2 of the denominator of the 3×3 matrix. max_v (maximum value in the clipping operation) is a function of the input/output bitdepth and the increment bitdepth (inc_bd) for better precision, can be as follows:

```
inc_bd = 4;
max_v = (1 << ( inputBitdepth + inc_bd ) ) - 1;
```

As introduced above, video decoder 30 may compute the first row of the forward 3×3 matrix. The following code illustrates an example of how video decoder 30 may implement this technique for computing the forward 3×3 matrix coefficients (3×1ForVec) for "non collocated" luma samples. The vector (3×1ForVec) corresponds to the first row of the forward 3×3 matrix.

```
c1 = 3x3Mat[1][1] * 3x3Mat[2][2] - 3x3Mat[2][1] * 3x3Mat[1][2];
c2 = 3x3Mat[0][1] * 3x3Mat[2][2] - 3x3Mat[2][1] * 3x3Mat[0][2];
c3 = 3x3Mat[0][1] * 3x3Mat[1][2] - 3x3Mat[1][1] * 3x3Mat[0][2];
offset = 1 << (2 * log2Den - 1);
```

```
d = (3x3Mat[0][0] * c1 - 3x3Mat[1][0] * c2 + 3x3Mat[2][0] * c3 + offset) >> (2
* log2Den);
  3x1ForVec[0] = floor(c1 / d + 0.5);
  3x1ForVec[1] = -floor(c2 / d + 0.5);
  3x1ForVec[2] = floor(c3 / d + 0.5);
```

Where floor(.) is the rounding down operation.

Video decoder 30 may be configured to recover luma samples. The following code illustrates an example of how video decoder 30 may implement this technique of recovering the luma samples from the 'reconstructed' chroma samples (Cbi, Cri), that is, the chroma samples after applying the inverse 3×3 matrix and the first row of the forward 3×3 matrix:

```
  Yi[(2 * j) * width + (2 * i)] =iClip((Y0 - 3x1ForVec[1] * Cb - 3x1ForVec[2] *
Cr) / 3x1ForVec[0], 0, max_v);
  Yi[(2 * j) * width + (2 * i + 1)] = iClip((Y1 - 3x1ForVec[1] * Cb -
3x1ForVec[2] * Cr) / 3x1ForVec[0], 0, max_v);
  Yi[(2 * j + 1) * width + (2 * i)] = iClip((Y2 - 3x1ForVec[1] * Cb -
3x1ForVec[2] * Cr) / 3x1ForVec[0], 0, max_v);
  Yi[(2 * j + 1) * width + (2 * i+1)] = iClip((Y3 - 3x1ForVec[1] * Cb -
3x1ForVec[2] * Cr) / 3x1ForVec[0], 0, max_v);
  where,
  Y0 = Yo[(2 * j) * width + (2 * i)] << log2Den;
  Y1 = Yo[(2 * j) * width + (2 * i + 1)] << log2Den;
  Y2 = Yo[(2 * j + 1) * width + (2 * i)] << log2Den;
  Y3 = Yo[(2 * j + 1) * width + (2 * i + 1)] << log2Den;
  and
  Cb = Cbi[j * widthC + i]
  Cr = Cri[j * widthC + i]
``` and width is the width of the picture in luma samples.

The proposed techniques of this disclosure can be utilized in algorithms conducting processing in a color space that is different from an original color space of the input data.

In some examples, dynamic range clipping/clamping of the video data in YCbCr 4:2:0 representation may to be applied in the RGB 4:4:4 representation. Thus chroma upsampling to 4:4:4 is applied first, followed by a 3×3 matrix, underlined clipping/clamping in RGB 4:4:4 representation, followed by an inverse 3×3 matrix and downsampling from 4:4:4 representation to 4:2:0. Examples of this disclosure may allow omission of upsampling and downsampling processing.

In some examples, certain processes that utilize filtering, e.g. denoising, resizing or rescaling can be applied in RGB 4:4:4 representation. Thus, chroma upsampling to 4:4:4 to be applied first, followed by a 3×3 matrix, underlined filtering in RGB 4:4:4 representation, followed by an inverse 3×3 matrix and downsampling from 4:4:4 representation to 4:2:0. Examples of this disclosure may allow omission of upsampling and downsampling processing and enables filtering in sub-sampled RGB domain. Example of such process, with conversion from YCbCr of ITU-R BT.709 to RGB is depicted in FIG. 3, for forward and inverse conversion defined for the following matrixes:

M3×3=[1.000000 0.000000 1.574800;
  1.000000−0.187330−0.468130;
  1.000000 1.8556300 0.000000];
I3×3=[0.212600 0.715200 0.072200; −0.114572−0.385428 0.500000; 0.500000−0.454153−0.045847];

It should be noted that different types of conversions, such as SDR to HDR conversions, may utilize different matrix values.

Figure 5:
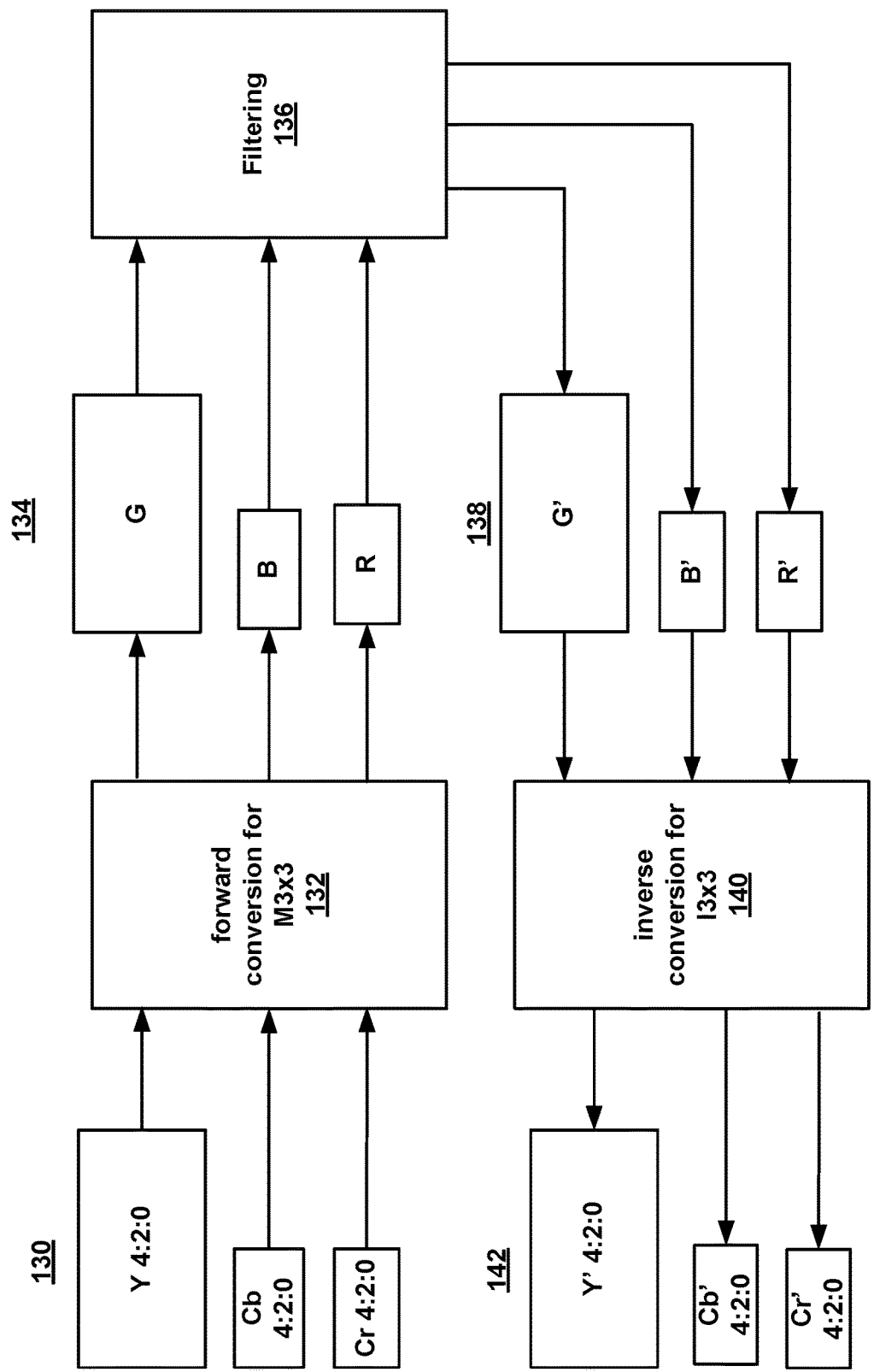
FIG. 5 is a flow diagram illustrating RGB domain filtering applied to video data in YCbCr 4:2:0 format.

FIG. 5 is a flow diagram illustrating RGB domain filtering being applied to video data in a YCbCr 4:2:0 format. Although FIG. 5 and the associated description generally describes decoder-side processing, it should be understood that the same techniques may also be applied by a video encoding device. In the example of FIG. 5, the different sizes of the data blocks depicting YCbCr and RGB reflects difference in spatial resolutions. For example, the Y data has four-times the resolution of the Cb and Cr data, and the G data has four-times the resolution of the B and R data. Similarly, the Y' data has four-times the resolution of the Cb' and Cr' data, and the G' data has four-times the resolution of the B' and R' data. According to the techniques of FIG. 5, a video processing device receives Y, Cb, and Cr video data (130) and, using the techniques of this disclosure, performs forward conversion on the data (132). After performing the forward conversion, the video processing device outputs R, G, and B data (134). The video processing device performs filtering on the R, G, and B data (136) and outputs filtered R, G, and B data (138), represented by R' G' and B' in FIG. 5. The filtering may, for example, include one or more of denoising, smoothing, sharpening, or other types of filtering. The video processing device performs an inverse conversion on the filtered R, G, and B data (140) and outputs filtered Y, Cb, and Cr video data, represented by Y', Cb', and Cr' in the example of FIG. 5.

According to one example technique of this disclosure, video encoder 20, or a pre- or post-processing device in conjunction with video encoder 20, may be configured to generate a first version of a current picture of the video data. The first version of the current picture may be formatted according to a sampling format, such as a 4:2:0 sampling format, in which there are fewer samples of a first component (e.g., a first chroma component) and of a second component (e.g., a second chroma component) than of a third component (e.g., a luma component). The first version of the current picture may include a sample of the first component (e.g., Cbi introduced above), a sample of the second component (e.g., Cri introduced above), and a sample of the third component (e.g., Yi introduced above). The sample of the first component (e.g., Cbi) and the sample of the second component (e.g., Cri) may be collocated, and the sample of the third component (e.g., Yi) may correspond to the sample of the first component (e.g., Cbi) and the sample of the second component (e.g., Cri).

Video encoder 20 may determine, using equation 4 above, for example, a transformed sample of the first component (e.g., Cbo introduced above), a transformed sample of the second component (e.g., Cro introduced above), and a transformed sample of the third component (e.g., Yo introduced above) by applying a matrix (e.g., M3×3 introduced above) to a triplet (e.g., Yi, Cbi, Cri). Video encoder 20 may include the transformed sample of the first component (e.g., Cbo), the transformed sample of the second component (e.g., Cro), and the transformed sample of the third component (e.g., Yo) in a second version of the current picture. Video encoder 20 may determine, using equation 5 above, for example, based on the transformed sample of the first component (e.g., Cbo), the transformed sample of the second component (e.g., Cro), the transformed sample of the third component (e.g., Yo), and a first row of the matrix (e.g., 3×1ForVec introduced above), a set of transformed samples for the third component (e.g., a set of Yo samples). The set of transformed samples for the third component (set of Yo samples) may include samples of the third component (e.g., the luma component) that are immediately right, below, and below-right of the first transformed sample of the third component (e.g., Yo). Video encoder 20 may include the set of transformed samples for the third component in the second version of the current picture.

According to another example technique of this disclosure, video decoder 30, or a pre- or post-processing device in conjunction with video decoder 30, may be configured to receive a bitstream that includes an encoded representation of video data. Video decoder 30 may reconstruct, based on the bitstream, a first version of a current picture of the video data. The first version of the current picture may be formatted according to a sampling format, such as a 4:2:0 sampling format, in which there are fewer samples of a first component (e.g., a first chroma component) and a second component (e.g., a second chroma component) than of a third component (e.g., a luma component). The first version of the current picture may include a sample of the first component (e.g., Cbo introduced above), a sample of the second component (e.g., Cro introduced above), and a sample of the third component (e.g., Yo introduced above), and the sample of the third component (e.g., Yo) may correspond to the sample of the first component (e.g., Cbo) and the sample of the second component (e.g., Cro).

Video decoder 30 may determine, using equation 3 above, a transformed sample of the first component (e.g., Cbi introduced above), a transformed sample of the second component (e.g., Cri introduced above), and a transformed sample of the third component (e.g., Yi introduced above) by applying a first matrix (e.g., I3×3 introduced above) to a triplet (e.g., Yo, Cbo, and Cro). Video decoder 30 may include the transformed sample of the first component (Cbi), the transformed sample of the second component (Cri), and the transformed sample of the third component (Yi) in a second version of the current picture. Video decoder 30 may determine, using equation 6 above, based on the transformed sample of the first component (Cbi), the transformed sample of the second component (Cri), the transformed sample of the third component (Yi), and a first row of a second matrix (e.g., 3×1ForVec introduced above), a set of transformed samples for the third component (set of Yi samples). The set of transformed samples for the third component (set of Yi samples) may include samples of the third component (e.g., the luma component) that are immediately neighboring the transformed sample of the third component (Yi). Video decoder 30 may include the set of transformed samples for the third component in the second version of the current picture.

Figure 6:
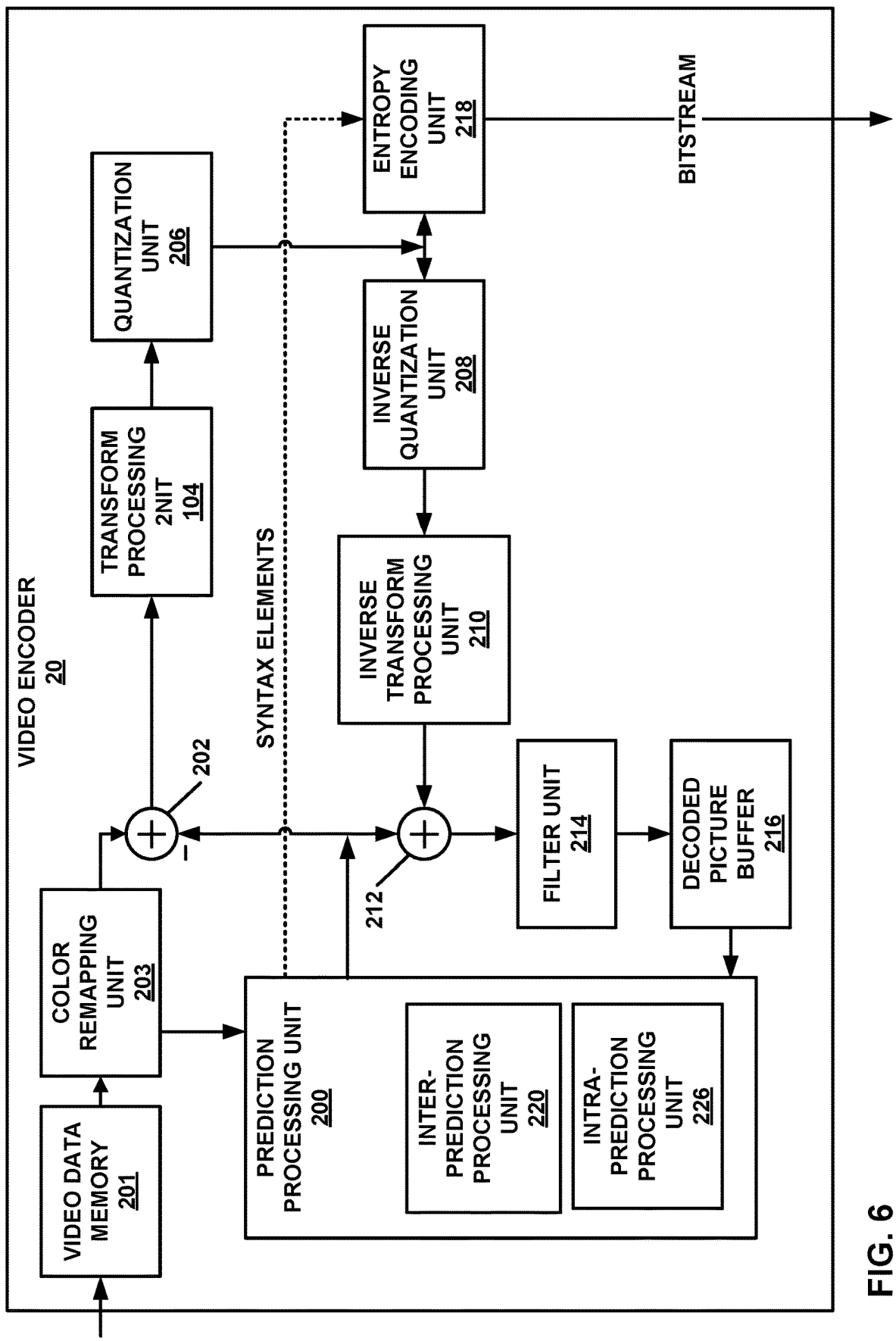
FIG. 6 is a block diagram illustrating an example video encoder that may implement one or more techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 6 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 6 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 6, video encoder 20 includes a prediction processing unit 200, video data memory 201, a color remapping unit 203, a residual generation unit 202, a transform processing unit 204, a quantization unit 206, an inverse quantization unit 208, an inverse transform processing unit 210, a reconstruction unit 212, a filter unit 214, a decoded picture buffer 216, and an entropy encoding unit 218. Prediction processing unit 200 includes an inter-prediction processing unit 220 and an intra-prediction processing unit 226. Inter-prediction processing unit 220 may include a motion estimation unit and a motion compensation unit (not shown).

Video data memory 201 may be configured to store video data to be encoded by the components of video encoder 20. The video data stored in video data memory 201 may be obtained, for example, from video source 18. Decoded picture buffer 216 may be a reference picture memory that stores reference video data for use in encoding video data by video encoder 20, e.g., in intra- or inter-coding modes. Video data memory 201 and decoded picture buffer 216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 201 and decoded picture buffer 216 may be provided by the same memory device or separate memory devices. In various examples, video data memory 201 may be on-chip with other components of video encoder 20, or off-chip relative to those components. Video data memory 201 may be the same as or part of storage media 19 of FIG. 1.

Color remapping unit 203 remaps color information. For instance, color remapping unit 203 may apply the techniques described in this disclosure for applying color remapping to 4:2:0 content without upsampling from 4:2:0 to a 4:4:4 format. Although shown as being part of video encoder 20 in the example of FIG. 6, the functionality of color remapping unit 203 may also be implemented by a video processing device that is separate from video encoder 20.

Video encoder 20 receives video data. Video encoder 20 may encode each CTU in a slice of a picture of the video data. Each of the CTUs may be associated with equally-sized luma CTBs and corresponding CTBs of the picture. As part of encoding a CTU, prediction processing unit 200 may perform partitioning to divide the CTBs of the CTU into progressively-smaller blocks. The smaller blocks may be coding blocks of CUs. For example, prediction processing unit 200 may partition a CTB associated with a CTU according to a tree structure.

Video encoder 20 may encode CUs of a CTU to generate encoded representations of the CUs (i.e., coded CUs). As part of encoding a CU, prediction processing unit 200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU.

Inter-prediction processing unit 220 may generate predictive data for a PU. As part of generating the predictive data for a PU, inter-prediction processing unit 220 performs inter prediction on the PU. The predictive data for the PU may include predictive blocks of the PU and motion information for the PU. Inter-prediction processing unit 220 may perform different operations for a PU of a CU depending on whether the PU is in an I slice, a P slice, or a B slice. In an I slice, all PUs are intra predicted. Hence, if the PU is in an I slice, inter-prediction processing unit 220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 220 may use uni-directional inter prediction to generate a predictive block of the PU. If a PU is in a B slice, inter-prediction processing unit 220 may use uni-directional or bi-directional inter prediction to generate a predictive block of the PU.

Intra-prediction processing unit 226 may generate predictive data for a PU by performing intra prediction on the PU. The predictive data for the PU may include predictive blocks of the PU and various syntax elements. Intra-prediction processing unit 226 may perform intra prediction on PUs in I slices, P slices, and B slices.

To perform intra prediction on a PU, intra-prediction processing unit 226 may use multiple intra prediction modes to generate multiple sets of predictive data for the PU. Intra-prediction processing unit 226 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 226 may use various numbers of intra prediction modes, e.g., 33 directional intra prediction modes. In some examples, the number of intra prediction modes may depend on the size of the region associated with the PU.

Prediction processing unit 200 may select the predictive data for PUs of a CU from among the predictive data generated by inter-prediction processing unit 220 for the PUs or the predictive data generated by intra-prediction processing unit 226 for the PUs. In some examples, prediction processing unit 200 selects the predictive data for the PUs of the CU based on rate/distortion metrics of the sets of predictive data. The predictive blocks of the selected predictive data may be referred to herein as the selected predictive blocks.

Residual generation unit 202 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 202 may generate the residual blocks of the CU such that each sample in the residual blocks has a value equal to a difference between a sample in a coding block of the CU and a corresponding sample in a corresponding selected predictive block of a PU of the CU.

In some examples, transform processing unit 204 partitions the residual blocks of a CU into transform blocks of TUs of the CU. For instance, transform processing unit 204 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In some examples, residual blocks of a CU are not partitioned into TUs. In such examples, a transform block of a CU is coextensive with a residual block of the CU.

Transform processing unit 204 may generate transform coefficient blocks by applying one or more transforms to residual data (e.g., the transform blocks of a TU). Transform processing unit 204 may apply various transforms to a transform block. For example, transform processing unit 204 may apply a discrete cosine transform (DCT), a directional transform, or a conceptually similar transform to a transform block. In some examples, transform processing unit 204 does not apply transforms to a transform block. In such examples, the transform block may be treated as a transform coefficient block.

Quantization unit 206 may quantize the transform coefficients in a coefficient block. Quantization unit 206 may quantize a coefficient block based on a quantization parameter (QP) value. Video encoder 20 may adjust the degree of quantization applied to the coefficient blocks by adjusting the QP value. Quantization may introduce loss of information. Thus, quantized transform coefficients may have lower precision than the original ones.

Inverse quantization unit 208 and inverse transform processing unit 210 may apply inverse quantization and inverse transforms to a coefficient block, respectively, to reconstruct a residual block from the coefficient block. Reconstruction unit 212 may add the reconstructed residual block to corresponding samples from one or more predictive blocks generated by prediction processing unit 200 to produce a reconstructed transform block associated with a TU. By reconstructing transform blocks in this way, video encoder 20 may reconstruct the coding blocks of a CU.

Filter unit 214 may perform one or more deblocking operations to reduce blocking artifacts in the coding blocks associated with a CU. Decoded picture buffer 216 may store the reconstructed coding blocks after filter unit 214 performs the one or more deblocking operations on the reconstructed coding blocks. Inter-prediction processing unit 220 may use a reference picture that contains the reconstructed coding blocks to perform inter prediction on PUs of other pictures. In addition, intra-prediction processing unit 226 may use reconstructed coding blocks in decoded picture buffer 216 to perform intra prediction on other PUs in the same picture as the CU.

Entropy encoding unit 218 may receive data from other functional components of video encoder 20. For example, entropy encoding unit 218 may receive coefficient blocks from quantization unit 206 and may receive syntax elements from prediction processing unit 200. Entropy encoding unit 218 may perform one or more entropy encoding operations on the data to generate entropy-encoded data. For example, entropy encoding unit 218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 218. For instance, the bitstream may include data that represents values of transform coefficients for a CU.

Figure 7:
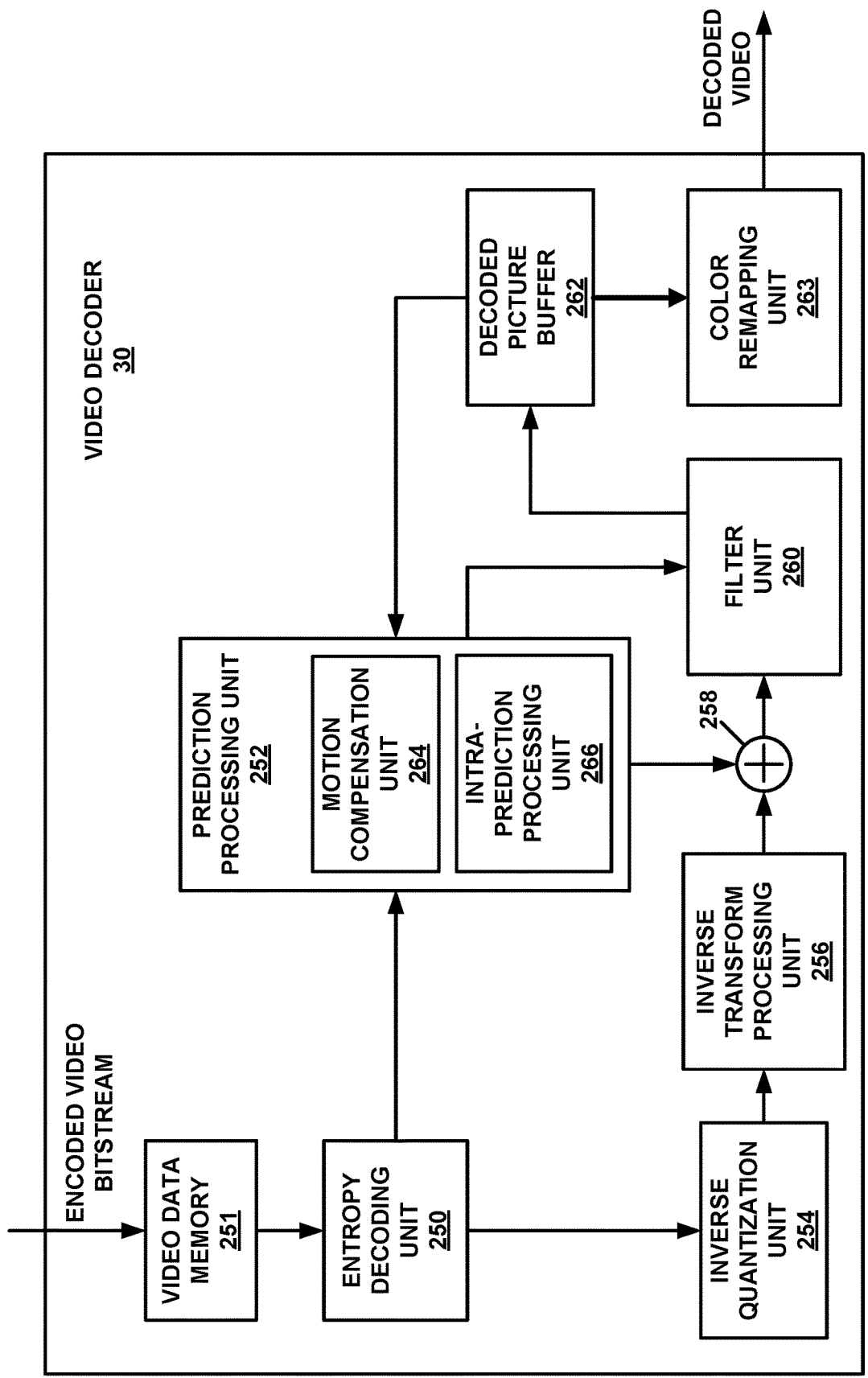
FIG. 7 is a block diagram illustrating an example video decoder that may implement one or more techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 7 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 7 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 7, video decoder 30 includes an entropy decoding unit 250, video data memory 251, a prediction processing unit 252, an inverse quantization unit 254, an inverse transform processing unit 256, a reconstruction unit 258, a filter unit 260, a decoded picture buffer 262, and a color remapping unit 263. Prediction processing unit 252 includes a motion compensation unit 264 and an intra-prediction processing unit 266. In other examples, video decoder 30 may include more, fewer, or different functional components.

Video data memory 251 may store encoded video data, such as an encoded video bitstream, to be decoded by the components of video decoder 30. The video data stored in video data memory 251 may be obtained, for example, from computer-readable medium 16, e.g., from a local video source, such as a camera, via wired or wireless network communication of video data, or by accessing physical data storage media. Video data memory 251 may form a coded picture buffer (CPB) that stores encoded video data from an encoded video bitstream. Decoded picture buffer 262 may be a reference picture memory that stores reference video data for use in decoding video data by video decoder 30, e.g., in intra- or inter-coding modes, or for output. Video data memory 251 and decoded picture buffer 262 may be formed by any of a variety of memory devices, such as dynamic DRAM, including SDRAM, MRAM, RRAM, or other types of memory devices. Video data memory 251 and decoded picture buffer 262 may be provided by the same memory device or separate memory devices. In various examples, video data memory 251 may be on-chip with other components of video decoder 30, or off-chip relative to those components. Video data memory 251 may be the same as or part of storage media 28 of FIG. 1.

Video data memory 251 receives and stores encoded video data (e.g., NAL units) of a bitstream. Entropy decoding unit 250 may receive encoded video data (e.g., NAL units) from video data memory 251 and may parse the NAL units to obtain syntax elements. Entropy decoding unit 250 may entropy decode entropy-encoded syntax elements in the NAL units. Prediction processing unit 252, inverse quantization unit 254, inverse transform processing unit 256, reconstruction unit 258, and filter unit 260 may generate decoded video data based on the syntax elements extracted from the bitstream. Entropy decoding unit 250 may perform a process generally reciprocal to that of entropy encoding unit 218.

In addition to obtaining syntax elements from the bitstream, video decoder 30 may perform a reconstruction operation on a CU. To perform the reconstruction operation on a CU, video decoder 30 may reconstruct residual blocks of the CU. As part of performing a reconstruction operation, inverse quantization unit 254 may inverse quantize, i.e., de-quantize, coefficient blocks. After inverse quantization unit 254 inverse quantizes a coefficient block, inverse transform processing unit 256 may apply one or more inverse transforms to the coefficient block in order to generate a residual block. For example, inverse transform processing unit 256 may apply an inverse DCT, an inverse integer transform, an inverse Karhunen-Loeve transform (KLT), an inverse rotational transform, an inverse directional transform, or another inverse transform to the coefficient block.

If a block, such as a PU, is encoded using intra prediction, intra-prediction processing unit 266 may perform intra prediction to generate predictive blocks of the block. Intra-prediction processing unit 266 may use an intra prediction mode to generate the predictive blocks of the block based on samples in spatially-neighboring blocks. Intra-prediction processing unit 266 may determine the intra prediction mode for the block based on one or more syntax elements obtained from the bitstream.

If a block, such as a PU, is encoded using inter prediction, entropy decoding unit 250 may determine motion information for the block. Motion compensation unit 264 may determine, based on the motion information of the block, one or more reference blocks. Motion compensation unit 264 may generate, based on the one or more reference blocks, predictive blocks (e.g., predictive luma, Cb and Cr blocks) for the block.

Reconstruction unit 258 may use residual blocks (e.g., luma, Cb and Cr residual blocks) and the predictive blocks (e.g., luma, Cb and Cr blocks) to reconstruct the coding blocks (e.g., luma, Cb and Cr coding blocks) for the CU. For example, reconstruction unit 258 may add samples of the residual blocks to corresponding samples of the predictive blocks to reconstruct the coding blocks of the CU.

Filter unit 260 may perform a deblocking operation to reduce blocking artifacts associated with the coding blocks of the CU. Video decoder 30 may store the coding blocks of the CU in decoded picture buffer 262. Decoded picture buffer 262 may provide reference pictures for subsequent motion compensation, intra prediction, and presentation on a display device, such as display device 32 of FIG. 1. For instance, video decoder 30 may perform, based on the blocks in decoded picture buffer 262, intra prediction or inter prediction operations for PUs of other CUs.

Color remapping unit 263 may apply color remapping to reconstructed pictures. For instance, color remapping unit 263 may apply the techniques described in this disclosure for applying color remapping to 4:2:0 content without upsampling from 4:2:0 to a 4:4:4 format. Although shown as being part of video decoder 30 in the example of FIG. 7, the functionality of color remapping unit 263 may also be implemented by a video processing device that is separate from video decoder 30.

Figure 8:
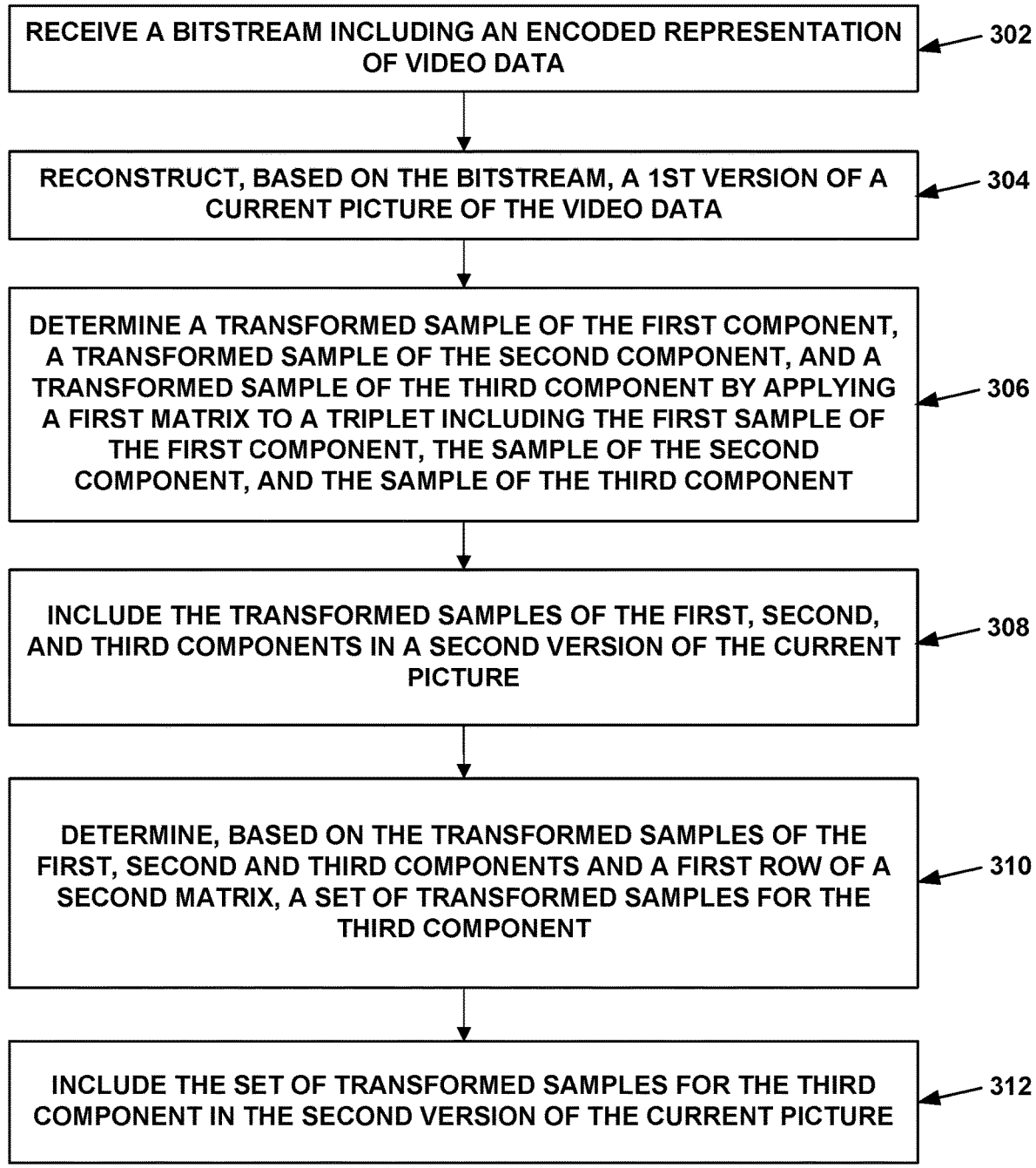
FIG. 8 is a flow diagram illustrating an example video decoding technique described in this disclosure.

FIG. 8 is a flow diagram illustrating an example video decoding technique described in this disclosure. The techniques of FIG. 8 will be described with reference to a generic video processing device, such as but not limited to video decoder 30 or to a color mapping unit that is external to video decoder 30.

In the example of FIG. 8, the video processing device receives a bitstream including an encoded representation of the video data (302). The video processing device reconstructs, based on the bitstream, a first version of a current picture of the video data (304). The first version of the current picture may be formatted according to a sampling format in which there are fewer samples of a first component and of a second component than of a third component. The sampling format may, for example, be a 4:2:0 format. The first version of the current picture may include a sample of the first component, a sample of the second component, and a sample of the third component. The sample of the first component and the sample of the second component may be collocated, and the sample of the third component may correspond to the samples of the first and second components.

The video processing device determines a transformed sample of the first component, a transformed sample of the second component, and a transformed sample of the third component by applying a first matrix to a triplet that includes the sample of the first component, the sample of the second component, and the sample of the third component (306). The video processing device includes the transformed sample of the first component, the transformed sample of the second component, and the transformed sample of the third component in a second version of the current picture (308). The video processing device determines, based on the transformed sample of the first component, the transformed sample of the second component, the transformed sample of the third component, and a first row of a second matrix, a set of transformed samples for the third component (310). The set of transformed samples for the third component may include samples of the third component that are immediately right, below, and below-right of the first transformed sample of the second color component. The first matric may be an inverse matrix, and the second matrix may be a forward matrix, with the inverse matrix being an inverse of the forward matrix. The video processing device includes the set of transformed samples for the third component in the second version of the current picture (312).

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, TUs, macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In this disclosure, ordinal terms such as "first," "second," "third," and so on, are not necessarily indicators of positions within an order, but rather may simply be used to distinguish different instances of the same thing.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a bitstream comprising an encoded representation of the video data;
   reconstructing, based on the bitstream, a first version of a current picture of the video data,
      wherein:
         the first version of the current picture is formatted according to a sampling format in which there are fewer samples of a first component and a second component than of a third component,
         the first version of the current picture includes a sample of the first component, a sample of the second component, and a sample of the third component, and
         the sample of the third component corresponds to the sample of the first component and the sample of the second component,
   for a collocated triplet comprising the sample of the first component, the sample of the second component, and the sample of the third component, determining a transformed sample of the first component, a transformed sample of the second component, and a transformed sample of the third component by applying a first matrix to the collocated triplet;
   including the transformed sample of the first component, the transformed sample of the second component, and the transformed sample of the third component in a second version of the current picture;
   for a set of samples in the third component that do not have collocated corresponding samples in the first component or the second component, determining, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and
   including the set of transformed samples for the third component in the second version of the current picture.

2. The method of claim 1, wherein the first component comprises a first chroma component, the second component comprises a second chroma component, and the third component comprises a luma component.

3. The method of claim 1, wherein the sample of the first component and the sample of the second color component are collocated with the sample of the third component.

4. The method of claim 1, further comprising:
   computing the first row of the second matrix.

5. The method of claim 1, further comprising:
   receiving data in the bitstream indicating the first row of the second matrix.

6. The method of claim 1, wherein the first matrix and the second matrix are 3×3 matrices, and wherein the second matrix is an inverse of the first matrix.

7. The method of claim 1, wherein the first version of the current picture is in a YCbCr color space and the second version of the current picture is in an RGB color space.

8. The method of claim 1, wherein the first version of the current picture is in a YCbCr color space with a first dynamic range and the second version of the current picture is in a YCbCr color space with a second dynamic range.

9. The method of claim 1, wherein the sampling format comprises a 4:2:0 format.

10. A device for processing video data, the device comprising:
    a memory configured to store a bitstream comprising an encoded representation of the video data; and
    one or more processors configured to:
        reconstruct, based on the bitstream, a first version of a current picture of the video data,
        wherein:
            the first version of the current picture is formatted according to a sampling format in which there are fewer samples of a first component and a second component than of a third component,
            the first version of the current picture includes a sample of the first component, a sample of the second component, and a sample of the third component, and
            the sample of the third component corresponds to the sample of the first component and the sample of the second component,
        for a collocated triplet comprising the sample of the first component, the sample of the second component, and the sample of the third component, determine a transformed sample of the first component, a transformed sample of the second component, and a transformed sample of the third component by applying a first matrix to the collocated triplet;
        include the transformed sample of the first component, the transformed sample of the second component, and the transformed sample of the third component in a second version of the current picture;
        for a set of samples in the third component that do not have collocated corresponding samples in the first component or the second component, determine, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and
        include the set of transformed samples for the third component in the second version of the current picture.

11. The device of claim 10, wherein the first component comprises a first chroma component, the second component comprises a second chroma component, and the third component comprises a luma component.

12. The device of claim 10, wherein the sample of the first component and the sample of the second color component are collocated with the sample of the third component.

13. The device of claim 10, wherein the one or more processors are further configured to:
    compute the first row of the second matrix.

14. The device of claim 10, wherein the one or more processors are further configured to:
    receive data in the bitstream indicating the first row of the second matrix.

15. The device of claim 10, wherein the first matrix and the second matrix are 3×3 matrices, and wherein the second matrix is an inverse of the first matrix.

16. The device of claim 10, wherein the first version of the current picture is in a YCbCr color space and the second version of the current picture is in an RGB color space.

17. The device of claim 10, wherein the first version of the current picture is in a YCbCr color space with a first dynamic range and the second version of the current picture is in a YCbCr color space with a second dynamic range.

18. The device of claim 10, wherein the device comprises a wireless communication device, further comprising a receiver configured to receive the encoded representation of the video data.

19. The device of claim 18, wherein the wireless communication device comprises a telephone handset and wherein the receiver is configured to demodulate, according to a wireless communication standard, a signal comprising the encoded video data.

20. A non-transitory computer-readable storage medium storing instructions that when executed by one or more processors cause the one or more processors to:
    receive a bitstream comprising an encoded representation of the video data;
    reconstruct, based on the bitstream, a first version of a current picture of the video data, wherein:
        the first version of the current picture is formatted according to a sampling format in which there are fewer samples of a first component and a second component than of a third component,
        the first version of the current picture includes a sample of the first component, a sample of the second component, and a sample of the third component, and
        the sample of the third component corresponds to the sample of the first component and the sample of the second component,
    for a collocated triplet comprising the sample of the first component, the sample of the second component, and the sample of the third component, determine a transformed sample of the first component, a transformed sample of the second component, and a transformed sample of the third component by applying a first matrix to the collocated triplet comprising the sample of the first component, the sample of the second component, and the sample of the third component;
    include the transformed sample of the first component, the transformed sample of the second component, and the transformed sample of the third component in a second version of the current picture;
    for a set of samples in the third component that do not have collocated corresponding samples in the first component or the second component, determine, based on the transformed sample of the first component, the transformed sample of the second component, the transformed sample of the third component, and a first row of a second matrix, a set of transformed samples for the third component, the set of transformed samples for the third component including samples of the third component that are immediately neighboring the transformed sample of the third component; and
    include the set of transformed samples for the third component in the second version of the current picture.

* * * * *